US010011277B2

(12) United States Patent
Meinhart et al.

(10) Patent No.: US 10,011,277 B2
(45) Date of Patent: Jul. 3, 2018

(54) VEHICLE COLLISION AVOIDANCE (71) Applicant: Ford Global Technologies, LLC, Dearborn, MI (US)

(72) Inventors: Matthew Joseph Meinhart, Royal Oak, MI (US); Alex Maurice Miller, Canton, MI (US); Roger Arnold Trombley, Ann Arbor, MI (US); Gang Song, Canton, MI (US); Ahsan Qamar, Canton, MI (US); Fangjun Jiang, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 15/171,287

(22) Filed: Jun. 2, 2016

(65) Prior Publication Data
US 2017/0349168 A1    Dec. 7, 2017

(51) Int. Cl.
*B60W 30/09*    (2012.01)
*B60W 30/095*   (2012.01)

(52) U.S. Cl.
CPC .......... *B60W 30/09* (2013.01); *B60W 30/095* (2013.01); *B60W 2550/20* (2013.01)

(58) Field of Classification Search
CPC . B60W 30/09; B60W 30/095; B60W 2550/20
USPC ................... 701/70; 340/988, 435
See application file for complete search history.

(56) References Cited

U.S. PATENT DOCUMENTS

| | | | |
|---|---|---|---|
| 6,067,031 A | 5/2000 | Janky et al. | |
| 6,084,508 A | 7/2000 | Mai et al. | |
| 7,145,441 B2 | 12/2006 | Knoop et al. | |
| 7,209,051 B2 | 4/2007 | Shankwitz et al. | |
| 7,505,850 B2 | 3/2009 | Kim et al. | |
| 8,466,807 B2 | 6/2013 | Mudalige | |
| 8,577,550 B2 | 11/2013 | Lu et al. | |
| 8,751,142 B2 | 6/2014 | Kim | |
| 8,831,870 B2 | 9/2014 | Whikehart et al. | |
| 8,930,105 B2 | 1/2015 | Cetinkaya | |
| 9,150,199 B2 | 10/2015 | Schleicher et al. | |
| 2003/0016143 A1 | 1/2003 | Ghazarian | |

(Continued)

FOREIGN PATENT DOCUMENTS

CN           1766232 A      5/2006
CN        202057015 U     11/2011
(Continued)

OTHER PUBLICATIONS

Non-Final Office Action dated Oct. 6, 2017 for U.S. Appl. No. 15/169,428 (35 pages).
Final Office Action dated May 10, 2018; U.S. Appl. No. 15/169,428.

*Primary Examiner* — Marthe Y Marc-Coleman
(74) *Attorney, Agent, or Firm* — Frank A. MacKenzie; Bejin Bieneman PLC (57) ABSTRACT A path of a target object is predicted. A path of a non-moving host vehicle is predicted based on at least one of a predetermined host vehicle acceleration and a predetermined host vehicle speed. A threat number for the target is determined based at least in part on the predicted path of the host vehicle, the threat number indicating a probability of a collision between the target and the host vehicle. A brake is actuated when the threat number is above a threat number threshold.

18 Claims, 4 Drawing Sheets

(56) References Cited

U.S. PATENT DOCUMENTS

| | | | |
|---|---|---|---|
| 2006/0284481 A1* | 12/2006 | Yone | B60T 7/042 303/155 |
| 2007/0005609 A1 | 1/2007 | Breed | |
| 2007/0276600 A1 | 11/2007 | King et al. | |
| 2008/0114530 A1 | 5/2008 | Petrisor et al. | |
| 2011/0298603 A1 | 12/2011 | King et al. | |
| 2012/0095646 A1 | 4/2012 | Ghazarian | |
| 2013/0026916 A1 | 1/2013 | Imaeda | |
| 2013/0116859 A1 | 5/2013 | Ihlenburg | |
| 2014/0303882 A1 | 10/2014 | Jang et al. | |
| 2014/0347207 A1 | 11/2014 | Zeng et al. | |
| 2015/0210256 A1* | 7/2015 | Yamashita | B60T 7/22 303/14 |
| 2015/0210280 A1 | 7/2015 | Agnew | |
| 2016/0052515 A1 | 2/2016 | Choi et al. | |
| 2016/0194000 A1* | 7/2016 | Taki | B60T 7/22 701/70 |
| 2017/0120906 A1* | 5/2017 | Penilla | B60W 30/09 |

FOREIGN PATENT DOCUMENTS

| | | |
|---|---|---|
| CN | 202868581 U | 4/2013 |
| CN | 103871272 A | 6/2014 |
| CN | 103898822 A | 7/2014 |
| CN | 104134370 A | 11/2014 |
| DE | 102007015032 A1 | 1/2008 |
| GB | 2498438 A | 7/2013 |
| JP | H11175896 A | 7/1999 |
| JP | 2005173703 A | 6/2005 |
| JP | 200964331 A | 3/2009 |
| JP | 2009087372 A | 4/2009 |
| JP | 2009146219 A | 7/2009 |
| JP | 20146609 A | 1/2014 |
| KR | 101414571 | 6/2014 |
| WO | 2010110109 A1 | 9/2010 |
| WO | 2011156621 A2 | 12/2011 |
| WO | 2015136958 A1 | 9/2015 |

* cited by examiner

VEHICLE COLLISION AVOIDANCE

BACKGROUND

Vehicle collisions often occur at intersections. Collision avoidance systems use sensors to detect a target that can collide with a host vehicle in the intersection. The systems can detect a target object position and speed to determine a probability of a collision with the host vehicle. Collision avoidance systems use a host vehicle position and speed to determine the probability of the collision. However, current collision avoidance systems are lacking in various ways, e.g., with respect to determining the probability of a collision at intersections where a host vehicle is at a standstill.

DETAILED DESCRIPTION

A computing device in a host vehicle can use a drive history of the host vehicle to predict a projected path of the host vehicle, even when the host vehicle is at a standstill, and to avoid a collision with a target. The computing device in the host vehicle is further programmed to predict a projected path of a target. The computing device can determine a threat number for the target based at least in part on the projected path of the host vehicle. The threat number indicates a probability of a collision between the target and the host vehicle. The computing device can further identify a trigger indicating an intent to move the host vehicle. The computing device can actuate a brake subsystem when the trigger indicates the intent to move the host vehicle and the threat number is above a threat number threshold.

Figure 1:
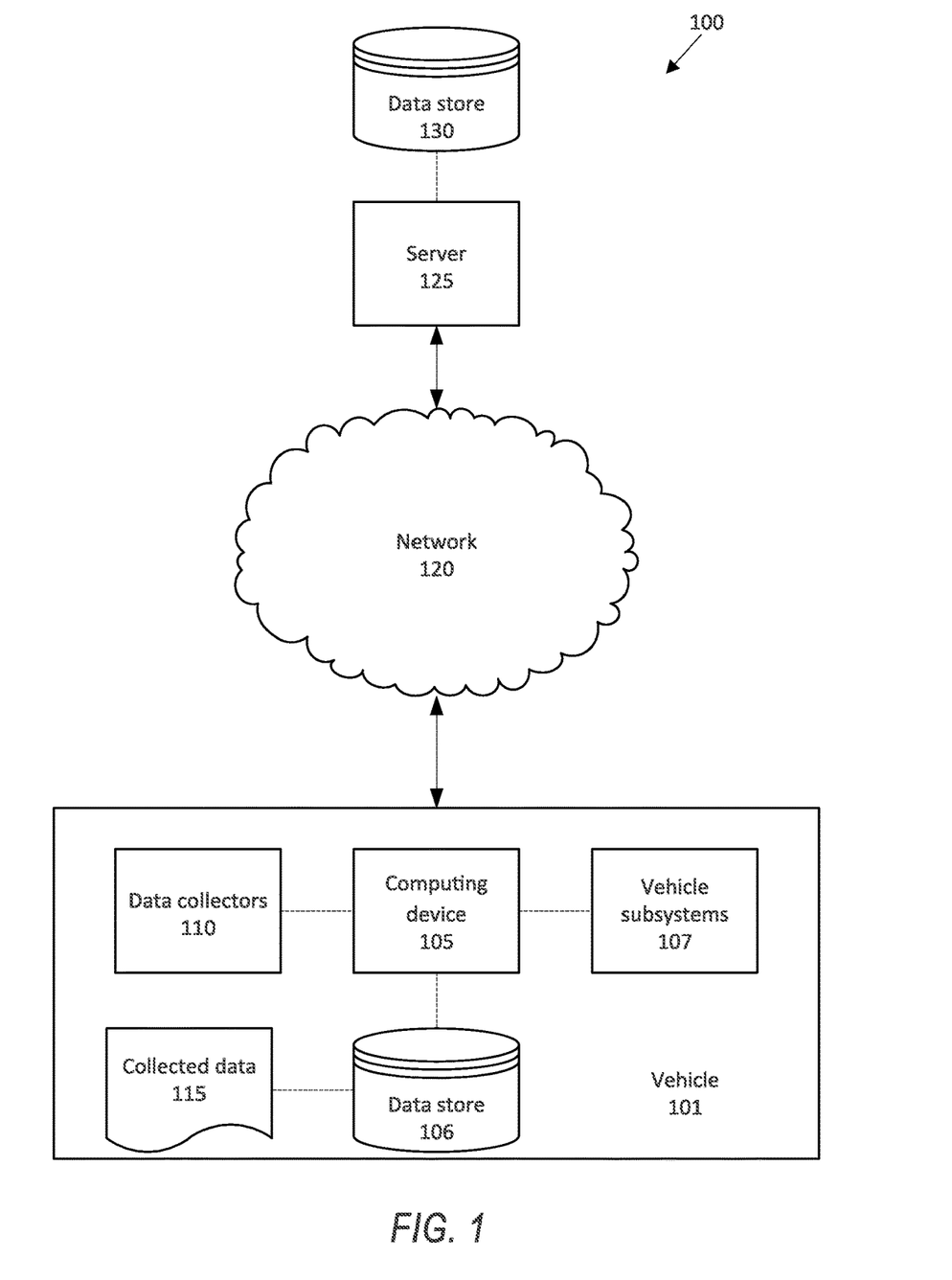
FIG. 1 is a block diagram of an example collision avoidance system.

FIG. 1 illustrates a system 100 for operating a vehicle 101. A computing device 105 in the vehicle 101 is programmed to receive collected data 115 from one or more data collectors 110. e.g., vehicle 101 sensors. For example, vehicle 101 data 115 may include a location of the vehicle 101, a location of a target, etc. Location data may be in a known form. e.g., geo coordinates (latitude and longitude coordinates) obtained via a navigation system, as is known, that uses the Global Position System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including data collectors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type. e.g., hard disk drives, solid state drives, servers, or any volatile or non-volatile media. The data store 106 may store the collected data 115 sent from the data collectors 110.

The vehicle 101 may include a plurality of subsystems 107. The subsystems 107 control vehicle 101 components, e.g., a vehicle seat, mirror, tiltable and/or telescoping steering wheel, etc. The subsystems 107 include. e.g., a steering subsystem, a propulsion subsystem, a brake subsystem, etc. The computing device 105 may actuate the subsystems 107 to control the vehicle 101 components, e.g., to stop the vehicle 101, to avoid targets, etc. For example, the brake subsystem 107 can include a brake hold feature that actuates the brake subsystem without depressing a brake pedal. When the brake hold feature is enabled, the computing device 105 may actuate the brake subsystem 107 to apply the brake to hold the vehicle 101. As used herein, a "brake hold" refers to application of the brake subsystem 107 to brake the vehicle 101 without input from a brake pedal. That is, in a brake hold, the brake subsystem 107 brakes the vehicle 101 even if an operator removes his or her foot from the brake pedal or depresses the accelerator pedal.

The brake hold feature can include an operator-activated brake hold feature that the operator can selectively activate. A prompt. e.g., a button, a screen icon, etc., on a vehicle 101 dashboard can be actuated to enable the operator-activated brake hold feature. The operator-activated brake hold feature allows a host vehicle 101 operator to apply the brake subsystem 107 without depressing the brake pedal, which can be used for, e.g., traffic stops that take a long period of time to prevent fatigue in the operator's foot and leg. The prompt can be actuated again to disable the operator-activated brake hold feature.

Data collectors 110 may include a variety of devices. For example, various controllers in a vehicle may operate as data collectors 110 to provide data 115 via the vehicle 101 network or bus, e.g., data 115 relating to vehicle speed, acceleration, position, system and/or component status, etc. Further, other data collectors 110 could include cameras, motion detectors, etc., i.e., data collectors 110 to provide data 115 for evaluating location of a target, projecting a path of a target, etc.

Collected data 115 may include a variety of data collected in a vehicle 101. Examples of collected data 115 are provided above, and moreover, data 115 are generally collected using one or more data collectors 110, and may additionally include data calculated therefrom in the computing device 105, and/or at the server 125. In general, collected data 115 may include any data that may be gathered by the data collectors 110 and/or computed from such data.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth. IEEE 802.11, etc.), local area networks (LAN) and/or wide area networks (WAN), including the Internet, providing data communication services.

Figure 2:
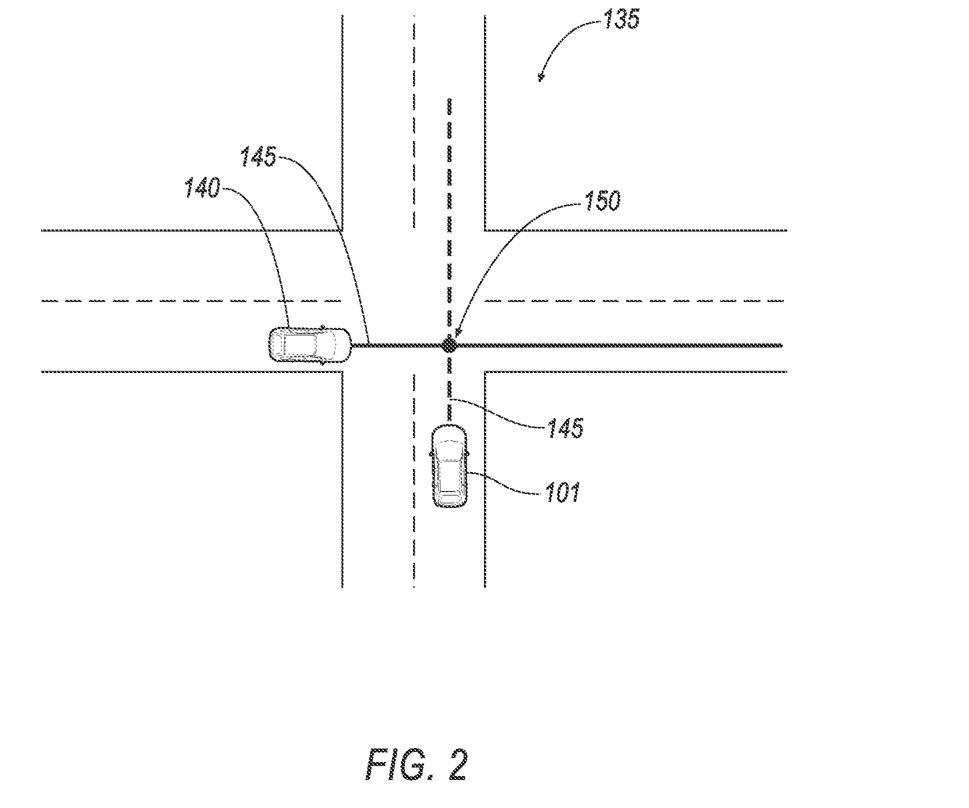
FIG. 2 illustrates an example intersection between a host vehicle at a standstill and a target object.

FIG. 2 illustrates a host vehicle 101 at an intersection 135. The host vehicle 101 is at a standstill at the intersection 135, i.e., the host vehicle 101 is not moving but is likely in gear with engine idling. The host vehicle 101 may be at a standstill because, e.g., the host vehicle 101 is at a stop sign, is waiting for a red light to change to green, parked, standing, etc. Because the host vehicle 101 is at a standstill, the computing device 105 cannot use the current vehicle 101 speed to predict future motion of the vehicle 101 and determine a threat number for an impending target 140. That is, based on the current host vehicle 101 speed, the computing device 105 would conventionally predict that the host vehicle 101 would stay at the standstill and would fail to identify a target 140 that has a possibility of colliding with the host vehicle 101 in the intersection 135.

The computing device 105 can detect a target 140 in or proximate to, i.e., within a predetermined distance of, such as 100 meters, 200 meters, etc., the intersection 135. The target 140 is an object that has a possibility of a collision with the host vehicle 101. For example, the target 140 may be a second vehicle having a target 140 speed, a target 140 direction of travel, and a target 140 distance from the host vehicle 101. The example of FIG. 2 includes one target vehicle 140. The target 140 may alternatively be another moving object. e.g., a pedestrian, or a stationary object. e.g., a road sign, a lamp post, a highway median wall, etc.

The computing device 105 is programmed to predict a target path 145 for the target 140 and a host path 145 for the host vehicle 101. The target path 145 is a predicted path that the target 140 will follow based on. e.g., the target 140 speed, the target 140 direction of travel, the target 140 position, etc. As used herein, a "position" of the target 140 and/or the host vehicle 101 refers to an absolute location determined by, e.g., geo-coordinates, a set of coordinates on a predetermined X-Y-Z Cartesian grid, etc. The computing device 105 can determine the host path 145 based on a motion profile. As used herein, the term "motion profile" refers to a set of values representing the host vehicle 101 speed and acceleration from the standstill and instructions for actuating one or more vehicle subsystem 107 to follow the movement from the standstill. For example, the motion profile can be determined to represent the host vehicle 101 moving at a "creep speed," i.e., as if the operator removes his or her foot from the brake pedal but does not depress the accelerator pedal. The computing device 105 is programmed to actuate vehicle subsystems 107 to move or brake the host vehicle 101 to avoid the target path 145.

The intersection 135 includes at least one crossing point 150. The crossing point 150 is the area where two paths 145 intersect, and can indicate a potential collision. That is, the path 145 includes a plurality of "location points," i.e., points that each specify a location according to geo-coordinates or the like. The computing device 105 compares location points of the target path 145 to the location points of the host path 145 and finds the location points that are within a predetermined range that the location points indicate that the target path 145 and the host path 145 intersect. The area where the target path 145 and the host path 145 intersect is defined as a crossing point 150. That is, at the crossing point 150, the host vehicle 101 and the target 140 share a same location, and if the host vehicle 101 and the target 140 are at the crossing point 150 at the same time, the host vehicle 101 and the target 140 will collide. For example, if a typical vehicle 101 is approximately 5 meters in length and approximately 2 meters in width, then the crossing point 150 can be defined as any overlap between a shape (e.g., a quadrilateral) approximately 5 meters in length and approximately 2 meters in width in the target path 145 and a shape approximately 5 meters in length and approximately 2 meters in width in the host path 145. The crossing point 150 indicates a potential collision between the target 140 and the host vehicle 101.

To determine a threat number for the target 140, the computing device 105 retrieves, e.g., from its memory, a motion profile of the host vehicle 101. The motion profile is a predetermined set of values prescribing the host vehicle 101 speed and acceleration based on the dimensions and specifications of the host vehicle 101. e.g., the vehicle 101 mass, the maximum torque of the vehicle 101 transmission torque converter, the initial torque of an electrical motor in a propulsion subsystem 107, etc. An example motion profile is shown below in Table 1:

TABLE 1

| Time From Standstill | Speed and Acceleration |
|---|---|
| 0 to 200 milliseconds (ms) | Acceleration of 1 meter per second per second (m/s/s). |
| 200 ms to 4 seconds (s) | Speed rises to 2 meters per second (m/s). |
| More than 4 s | Maintain speed of 2 m/s. |

The motion profile can be predetermined and stored in the data store 106, and then values in the motion profile can be updated based on the host vehicle 101 drive history. For example, the motion profile may predict that the host vehicle 101 will move forward from a standstill to reach a predetermined speed according to the values in Table 1 above. The computing device 105 can update the motion profile when the computing device 105 recognizes how the vehicle 101 accelerates from a plurality of standstills, e.g., the operator may not lift his or her foot off of the brake pedal completely, so the acceleration can be lower (e.g., 0.75 m/s/s) during the 0-200 ms period than the values listed in Table 1. Based on the motion profile, the computing device 105 can predict the host path 145 that the host vehicle 101 will follow from the standstill. Based on the host path 145, the computing device 105 can determine the probability of a collision with a target 140. The motion profile can also include, e.g., an average time spent that the host vehicle 101 spends at a standstill, a time for an operator to transition from a brake pedal to an accelerator pedal (i.e., a pedal transition time), etc.

The computing device 105 uses the motion profile to predict the host path 145 of the host vehicle 101 when it moves from the standstill. Because the host vehicle 101 is at the standstill, the host vehicle 101 has no current speed. The computing device 105 typically predicts the host path 145 using the host vehicle 101 speed, and because the host vehicle 101 speed is 0 at the standstill, the computing device 105 must rely on the motion profile instead to predict the host vehicle 101 speed that the host vehicle 101 typically attains upon leaving the standstill.

The computing device 105 determines a threat number for the target 140 based on the target path 145, the host path 145, and the crossing point 150 using known techniques. The threat number for a target 140 indicates a probability of a collision between the target 140 and the host vehicle 101. The threat number can be determined based on at least one of a host vehicle 101 position, ability to steer, motion profile, a target 140 position, speed, direction of travel, ability to steer, etc. That is, the threat number indicates a probability that the target 140 and the host vehicle 101 will collide at the crossing point 150, and whether either of the target 140 and the host vehicle 101 can avoid the collision. The threat number is typically a value between 0 and 1, with numbers closer to 1 indicating a higher probability of a collision.

One example of a known technique to determine the threat number can be a ratio of a predicted deceleration to stop the target 140 at the crossing point 150 (i.e., a "zero-range" deceleration) and a predetermined maximum deceleration of the target vehicle 140 that the target vehicle 140 brake subsystem 107 can produce. As the target 140 approaches the crossing point 150, the zero-range deceleration required to stop the target 140 at the crossing point 150 increases, and the threat number thus increases. Because the target 140 requires more deceleration to stop at the crossing point 150, the probability of a collision with the host vehicle 101 increases, and thus the threat number increases. If the threat number is above a threat number threshold, the computing device 105 in the host vehicle 101 can actuate a vehicle subsystem 107 to avoid a potential collision with the target 140. The computing device 105 uses the threat number to determine specific adjustments to vehicle subsystems 107, e.g., the brake subsystem 107, to avoid the target 140 with a threat number above a threat number threshold to avoid collisions.

In the example of FIG. 2, the target path 145, shown in a solid line, crosses the host path 145, shown in a dashed line, at the crossing point 150. Based on the target 140 speed and direction of travel, the computing device 105 can determine the threat number for the target 140 should the host vehicle 101 move from the standstill according to the motion profile.

The computing device 105 can identify a trigger to activate the brake hold feature. The term "trigger" as used herein is defined as an indication of the host vehicle 101 moving forward from a standstill and/or an action performed by the operator indicating that the operator intends to move the host vehicle 101 forward from the standstill. For example, the trigger can be the operator lifting a foot off of a brake pedal and depressing an acceleration pedal while the vehicle 101 transmission is in a "drive" position. That is, a pedal position sensor 110 can determine that the brake pedal is beyond a brake pedal position threshold, indicating a release of the brake subsystem 107. Another trigger can be the host vehicle 101 moving forward on a downhill slope although the brake pedal is still depressed by the operator. The trigger indicates that the host vehicle 101 will take an action to move into the intersection 135 and in the path 145 of the target 140, increasing the likelihood of a collision with the target 140. The computing device 105 can be programmed to only apply the host motion profile thus the brake hold feature when the threat number is above the threat number threshold and the trigger is actuated.

If the threat number is below the threat number threshold but is above a second threat number threshold, the computing device 105 can prompt the operator to keep the host vehicle 101 at the standstill until the threat number drops below the second threat number threshold. As used herein, the term "prompt" refers to the computing device 105 sending a notification to the operator through, e.g., a vehicle 101 speaker, a vehicle 101 human-machine interface (HMI). That is, the computing device 105 prompts the operator by sending a notification to the operator, e.g., a visual and/or auditory cue. When the threat number is below the threat number threshold and above the second threat number threshold, the probability of a collision can warrant prompting the operator of the probability of the collision but not warrant applying a brake hold to prevent movement of the host vehicle 101. That is, the operator is notified of the probability of the collision but not prevented from moving the host vehicle 101 from the standstill. The computing device 105 can prompt the operator using, e.g., a light flashing on the HMI, a message displayed on the HMI, a siren, a whistle, etc.

The operator can release the brake hold by applying an override to the brake subsystem 107. As used herein, the term "override" refers to an action taken by the operator to remove the brake hold applied by the brake subsystem 107 when the threat number is above the threat number threshold. The operator can apply the override to move the host vehicle 101 when the threat number is above the threat number threshold but the operator desires to move the host vehicle 101. For example, if the target 140 is approaching the intersection 135 such that the threat number is above the threat number threshold, but the target 140 has a turn signal on indicating that the target 140 will turn out of the intersection before reaching the host vehicle, the operator can recognize that the probability of a collision is much smaller than the threat number may indicate. Thus, the operator can apply the override to release the brake hold and move the host vehicle 101. The override can be, e.g., depressing an accelerator pedal more than a predetermined threshold, depressing an accelerator pedal for a predetermined period of time, pressing the dashboard button to disable the brake hold feature, etc.

Figure 3:
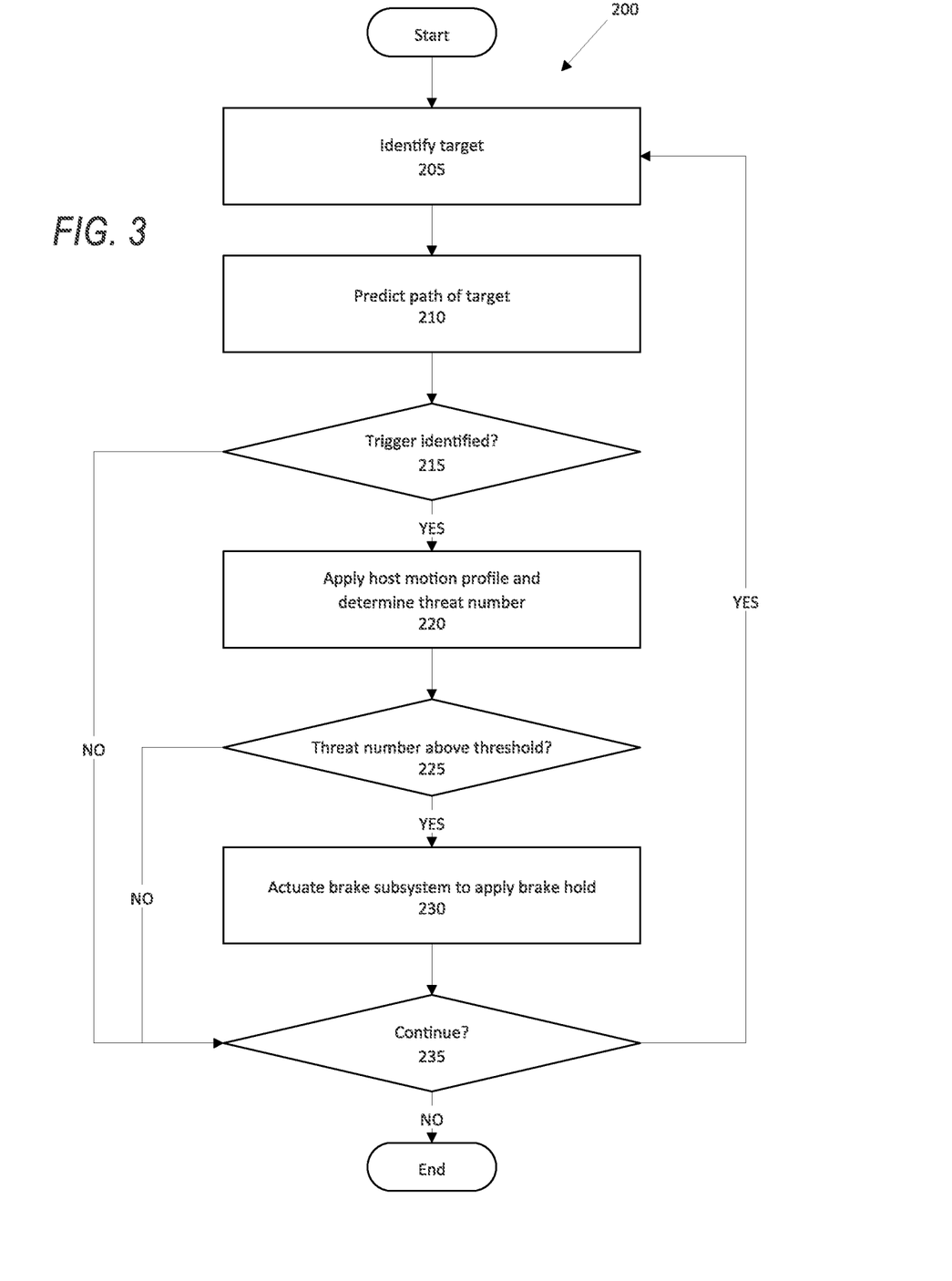
FIG. 3 illustrates an example process for avoiding a collision at an intersection.

FIG. 3 illustrates an example process 200 for operating a host vehicle 101 at an intersection 135. The process 200 begins in a block 205, where the computing device 105 collects data 115 from data collectors 110 and identifies a target 140. As described above, the target 140 can be a moving object. e.g. another vehicle 101 or a pedestrian, or a stationary object, e.g., a road sign.

Next, in a block 210, the computing device 105 predicts a path 145 of the target 140. As described above, the computing device 105 determines a predicted path 145 of the target 140 based at least in part on at least one of, e.g., a target 140 speed, a target 140 path of travel, a target 140 position, etc. In the example of FIG. 2, the path 145 shows the target vehicle 140 is moving in its respective lane such that the path 145 indicates that the target vehicle 140 will move straight forward relative to the roadway lane.

Next in a block 215, the computing device 105 identifies whether there is a trigger to activate the brake hold feature. As described above, the trigger is identified when the host vehicle 101 tends to move into the path 145 of the target 140. The trigger, i.e., indication of movement of the host vehicle 101, can be, e.g., the operator lifting foot off a brake pedal, the operator actuating an accelerator pedal, etc. If the trigger is identified, the process 200 continues in a block 220. Otherwise, the process 200 continues in the block 235.

Next, in a block 220, the computing device 105 applies a motion profile to project a path 145 of a host vehicle 101 at a standstill and determines a threat number for the target 140. As described above, the motion profile predicts motion of the host vehicle 101 after the standstill, and the computing device 105 can use the motion profile to project a path 145 of the host vehicle 101. Based on the projected paths 145 of the target 140 and the host vehicle 101, the computing device 105 can determine a threat number indicating a probability of a collision between the target 140 and the host vehicle 101.

Next, in a block 225, the computing device 105 determines whether the threat number is above a predetermined threat number threshold, i.e., a threshold at which the computing device 105 is programmed to actuate a brake subsystem 107 to prevent the host vehicle 101 from moving into the path 145 of the target 140. If the computing device 105 determines that the threat number is above the predetermined threat number threshold, the process 200 continues in a block 230. Otherwise, the process 200 continues in a block 235.

In the block 230, the computing device 105 actuates the brake subsystem 107 to apply a brake hold on the host vehicle 101 until the threat number falls below the threat number threshold. The brake subsystem 107 applies the brakes to the vehicle 101 wheels, preventing the host vehicle 101 from moving into the path 145 of the target 140. Thus, the host vehicle 101 avoids the target 140 until the threat number drops below the threat number threshold. In the process 200, the computing device 105 only applies the brake hold when the threat number is above the threat number threshold and the trigger is actuated.

In the block 235, the computing device 105 determines whether to continue the process 200. For example, if the operator shuts off the host vehicle 101, the computing device 105 determines not to continue the process 200. In another example, if the host vehicle 101 approaches another intersection 135 and reaches a standstill, the computing device 105 can determine to continue the process 200 to search for a new target 140. If the computing device 105 determines to continue, the process 200 returns to the block 205 to collect more data 115. Otherwise, the process 200 ends.

Figure 4:
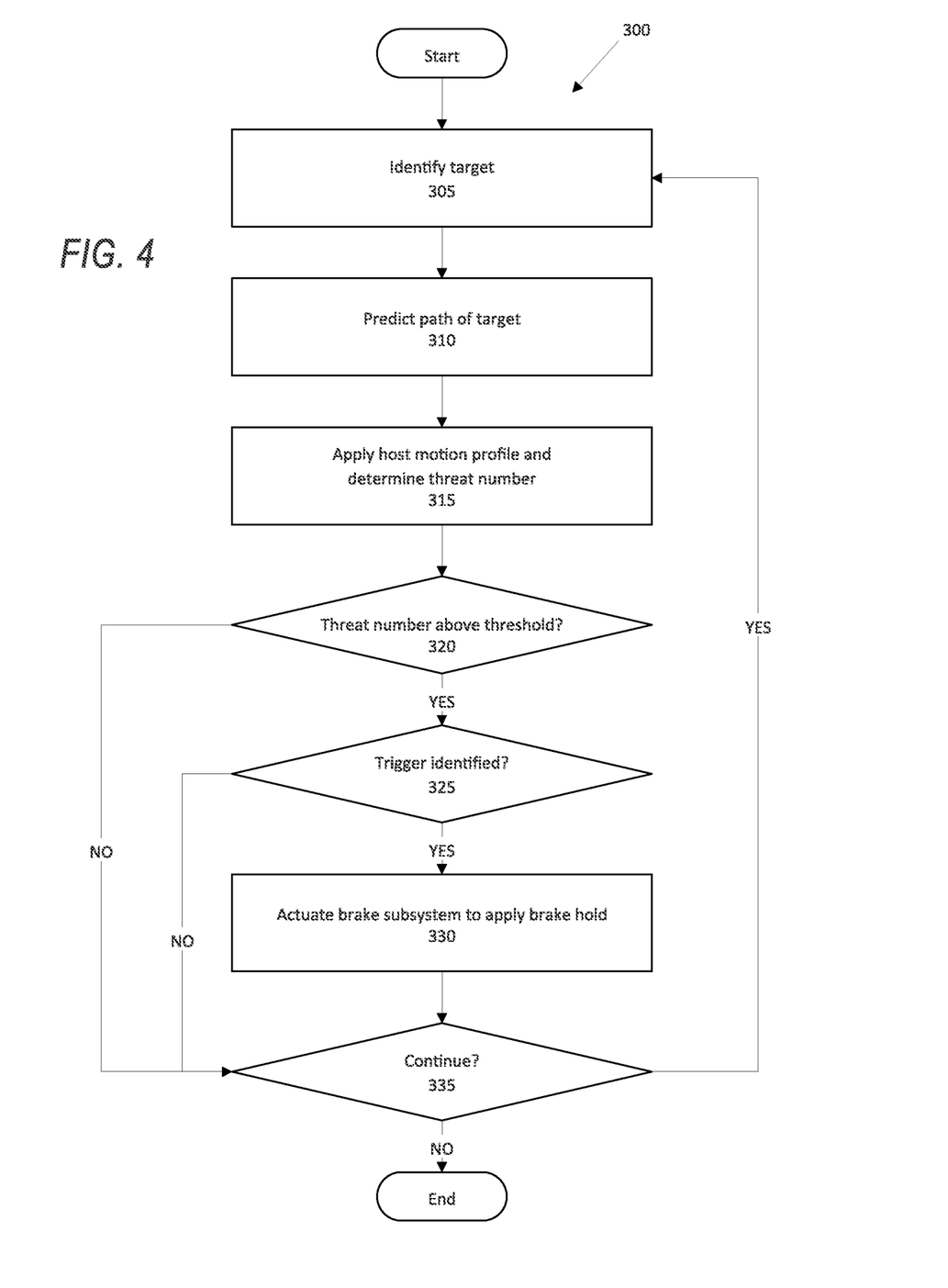
FIG. 4 illustrates another example process for avoiding a collision at an intersection.

FIG. 4 illustrates an example process 300 for operating a host vehicle 101 at an intersection 135. The process 300 begins in a block 305, where the computing device 105 collects data 115 from data collectors 110 and identifies a target 140. As described above, the target 140 can be a moving object, e.g. another vehicle 101 or a pedestrian, or a stationary object, e.g., a road sign.

Next, in a block 310, the computing device 105 predicts a path 145 of the target 140. As described above, the computing device 105 determines a predicted path 145 of the target 140 based at least in part on at least one of, e.g., a target 140 speed, a target 140 path of travel, a target 140 position, etc. In the example of FIG. 2, the path 145 shows the target vehicle 140 is moving in its respective lane such that the path 145 indicates that the target vehicle 140 will move straight forward relative to the roadway lane.

Next, in a block 315, the computing device 105 applies a motion profile to project a path 145 of a host vehicle 101 at a standstill and determines a threat number for the target 140. As described above, the motion profile predicts motion of the host vehicle 101 after the standstill, and the computing device 105 can use the motion profile to project a path 145 of the host vehicle 101. Based on the projected paths 145 of the target 140 and the host vehicle 101, the computing device 105 can determine a threat number indicating a probability of a collision between the target 140 and the host vehicle 101.

Next, in a block 320, the computing device 105 determines whether the threat number is above a predetermined threat number threshold, i.e., a threshold at which the computing device 105 is programmed to actuate a brake subsystem 107 to prevent the host vehicle 101 from moving into the path 145 of the target 140. If the computing device 105 determines that the threat number is above the predetermined threat number threshold, the process 300 continues in a block 325. Otherwise, the process 300 continues in a block 335.

Next, in a block 325, the computing device 105 identifies whether there is a trigger to activate the brake hold feature. As described above, the trigger is identified when the host vehicle 101 tends to move into the path 145 of the target 140. The trigger, i.e., indication of movement of the host vehicle 101, can be, e.g., the operator lifting foot off a brake pedal, the operator actuating an accelerator pedal, etc. If the trigger is identified, the process 300 continues in a block 330. Otherwise, the process 300 continues in the block 335.

In the block 330, the computing device 105 actuates the brake subsystem 107 to apply a brake hold on the host vehicle 101 until the threat number falls below the threat number threshold. The brake subsystem 107 applies the brakes to the vehicle 101 wheels, preventing the host vehicle 101 from moving into the path 145 of the target 140. Thus, the host vehicle 101 avoids the target 140 until the threat number drops below the threat number threshold. In the process 300, the computing device 105 only applies the brake hold when the threat number is above the threat number threshold and the trigger is actuated.

In the block 335, the computing device 105 determines whether to continue the process 300. For example, if the operator shuts off the host vehicle 101, the computing device 105 determines not to continue the process 300. In another example, if the host vehicle 101 approaches another intersection 135 and reaches a standstill, the computing device 105 can determine to continue the process 300 to search for a new target 140. If the computing device 105 determines to continue, the process 300 returns to the block 305 to collect more data 115. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising:
   a computer including a processor and a memory, the memory storing instructions executable by the computer to:
   predict a path of a target object;
   predict a path of a non-moving host vehicle from a standstill based on at least one of a predetermined host vehicle acceleration and a predetermined host vehicle speed;
   determine a threat number for the target based at least in part on the predicted path of the host vehicle, the threat number indicating a probability of a collision between the target and the host vehicle; and
   actuate a brake of the host vehicle when the threat number is above a threat number threshold to apply a brake hold to prevent the host vehicle from moving.

2. The system of claim 1, wherein the instructions further include instructions to identify vehicle operator input as a trigger indicating an intent to move the host vehicle and to actuate the brake when the trigger is identified and the threat number is above the threat number threshold.

3. The system of claim 2, wherein the instructions further include instructions to identify the trigger when a pedal position sensor detects that a position of a pedal is beyond a pedal position threshold.

4. The system of claim 2, wherein the instructions further include instructions to identify the trigger when a brake hold feature is disengaged.

5. The system of claim 1, wherein the instructions further include instructions to release the brake hold when an accelerator pedal is depressed for a predetermined period of time.

6. The system of claim 1, wherein the instructions further include instructions to release the brake hold when the threat number drops below the threat number threshold.

7. The system of claim 1, wherein the instructions further include instructions to prompt an operator of the host vehicle when the threat number is below the threat number threshold but above a second threat number threshold.

8. The system of claim 1, wherein the instructions further include instructions to determine the path of the host vehicle based at least in part on the predetermined host vehicle speed, the predetermined host vehicle acceleration, and at least one of a pedal transition time and an average time at a standstill.

9. The system of claim 1, wherein the instructions further include instructions to determine the threat number based at least in part on a deceleration required for the target object to stop at a crossing point between the path of the target object and the path of the host vehicle.

10. A method executable by a computer, comprising:
    predicting a path of a target object;
    predicting a path of a non-moving host vehicle from a standstill based on at least one of a predetermined host vehicle acceleration and a predetermined host vehicle speed;
    determining a threat number for the target based at least in part on the predicted path of the host vehicle, the threat number indicating a probability of a collision between the target and the host vehicle; and
    actuating a brake of the host vehicle when the threat number is above a threat number threshold to apply a brake hold to prevent the host vehicle from moving.

11. The method of claim 10, further comprising identifying vehicle operator input as a trigger indicating an intent to move the host vehicle and to actuate the brake when the trigger is identified and the threat number is above the threat number threshold.

12. The method of claim 11, further comprising identifying the trigger when a pedal position sensor detects that a position of a pedal is beyond a pedal position threshold.

13. The method of claim 11, further comprising identifying the trigger when a brake hold feature of the brake is disengaged.

14. The method of claim 10, further comprising releasing the brake hold when an accelerator pedal is depressed for a predetermined period of time.

15. The method of claim 10, further comprising releasing the brake hold when the threat number drops below the threat number threshold.

16. The method of claim 10, further comprising prompting an operator of the host vehicle when the threat number is below the threat number threshold but above a second threat number threshold.

17. The method of claim 10, further comprising determining the path of the host vehicle based at least in part on the predetermined host vehicle speed, the predetermined host vehicle acceleration, and at least one of a pedal transition time and an average time at a standstill.

18. The method of claim 10, further comprising determining the threat number based at least in part on a deceleration required for the target object to stop at a crossing point between the path of the target object and the path of the host vehicle.

* * * * *